(12) United States Patent
Kang et al.

(10) Patent No.: US 9,353,903 B2
(45) Date of Patent: May 31, 2016

(54) MOTION SIMULATOR

(71) Applicant: MOTION DEVICE INC., Siheung, Gyeonggi-Do (KR)

(72) Inventors: Yu Sin Kang, Seoul (KR); Jong Chan Lee, Gyeonggi-Do (KR); Sang Gon Chun, Gyeonggi-Do (KR)

(73) Assignee: MOTION DEVICE INC., Siheung, Gyeonggi-Do (KR)

( * ) Notice: Subject to any disclaimer, the term of this patent is extended or adjusted under 35 U.S.C. 154(b) by 0 days.

(21) Appl. No.: 14/826,834

(22) Filed: Aug. 14, 2015

(65) Prior Publication Data

US 2015/0354748 A1 Dec. 10, 2015

Related U.S. Application Data

(63) Continuation of application No. PCT/KR2013/003089, filed on Apr. 12, 2013.

(30) Foreign Application Priority Data

Feb. 20, 2013 (KR) .......................... 10-2013-0018180

(51) Int. Cl.
*A47G 29/00* (2006.01)
*F16M 11/20* (2006.01)
*G09B 9/14* (2006.01)
*A63G 31/16* (2006.01)
*G09B 9/00* (2006.01)
*G09B 9/12* (2006.01)

(52) U.S. Cl.
CPC ........... *F16M 11/2035* (2013.01); *A63G 31/16* (2013.01); *G09B 9/00* (2013.01); *G09B 9/12* (2013.01); *G09B 9/14* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,461,470 A | * | 7/1984 | Astroth | A63F 13/08 434/43 |
| 5,129,826 A | * | 7/1992 | Munsch | G09B 9/48 434/32 |
| 5,431,569 A | * | 7/1995 | Simpkins | G09B 9/02 434/29 |
| 5,782,639 A | * | 7/1998 | Beal | A63B 71/0622 434/29 |
| 5,865,624 A | * | 2/1999 | Hayashigawa | G09B 9/04 434/29 |
| 5,901,612 A | * | 5/1999 | Letovsky | A47C 1/12 248/661 |
| 5,980,255 A | * | 11/1999 | Mathieu | A47C 7/72 434/29 |

(Continued)

*Primary Examiner* — Monica Millner
(74) *Attorney, Agent, or Firm* — Mintz Levin Cohn Ferris Glovsky and Popeo, P.C.; Kongsik Kim; Colleen H. Witherell (57) ABSTRACT

The objective of the present invention is to provide a motion simulator providing, to a link part, a buffering uniting part for absorbing impact during operation so as to prevent shaking of the motion simulator, thereby improving stability. To this end, the motion simulator of the present invention comprises: support members for supporting a chair on which a user sits, a monitor for providing images of a virtual environment according to the operation of the user, and a handle operated by the user for providing the virtual environment; and a plurality of link parts coupled to the lower portions of the support members so as to support the support members while simultaneously moving the same in the vertical direction, wherein at least one link part among the plurality of link parts are provided with buffering uniting parts for the absorption of impact.

2 Claims, 6 Drawing Sheets

(56) References Cited

U.S. PATENT DOCUMENTS

| | | | | |
|---|---|---|---|---|
| 5,980,256 A * | 11/1999 | Carmein | A63B 22/02 | 434/29 |
| 6,283,757 B1 * | 9/2001 | Meghnot | G09B 9/46 | 434/29 |
| 6,413,090 B1 * | 7/2002 | Shiina | G09B 9/14 | 434/55 |
| 6,609,912 B1 * | 8/2003 | Harashima | A63B 22/16 | 434/29 |
| 6,733,293 B2 * | 5/2004 | Forster | G09B 19/16 | 434/55 |
| 7,094,157 B2 * | 8/2006 | Fromyer | A63G 31/12 | 434/55 |
| 7,399,259 B2 * | 7/2008 | Somwong | A63B 22/0605 | 482/57 |
| 7,662,042 B2 * | 2/2010 | Oswald | A47C 15/004 | 434/29 |
| 7,866,982 B1 * | 1/2011 | Whitsitt | G09B 9/10 | 434/28 |
| 8,105,164 B2 * | 1/2012 | James-Herbert | A63B 21/00 | 463/36 |
| 8,657,376 B2 * | 2/2014 | Gagnon | F16C 29/02 | 297/322 |
| 8,827,709 B1 * | 9/2014 | Gurule | G09B 9/12 | 434/45 |
| 8,888,185 B2 * | 11/2014 | Liao | A47C 1/12 | 248/346.03 |
| 9,026,312 B2 * | 5/2015 | Smith | E02F 9/16 | 434/29 |
| 2005/0277092 A1 * | 12/2005 | Hwang | G09B 19/16 | 434/55 |
| 2007/0218427 A1 * | 9/2007 | Lefton | A63G 31/16 | 434/29 |
| 2007/0262628 A1 * | 11/2007 | Perigny | A63F 13/08 | 297/284.4 |
| 2007/0269771 A1 * | 11/2007 | Lefton | G09B 9/14 | 434/29 |
| 2009/0163283 A1 * | 6/2009 | Childress | A63F 13/08 | 463/47 |
| 2009/0282941 A1 * | 11/2009 | Chang | A63G 31/16 | 74/470 |
| 2010/0028837 A1 * | 2/2010 | Holloway | G05G 1/38 | 434/30 |
| 2011/0177873 A1 * | 7/2011 | Sebelia | A63F 13/02 | 472/130 |
| 2012/0019030 A1 * | 1/2012 | Menard | A47C 1/12 | 297/217.3 |
| 2012/0301853 A1 * | 11/2012 | Garvis | G09B 9/14 | 434/58 |
| 2013/0001995 A1 * | 1/2013 | Garvis | G09B 9/12 | 297/314 |

* cited by examiner

FIG. 1

Related Art

MOTION SIMULATOR

CROSS-REFERENCE TO RELATED APPLICATIONS

This is a continuation of International Application No. PCT/KR2013/003089 filed on Apr. 12, 2013, which claims priority to Korean Application No. KR 10-2013-0018180 filed Feb. 20, 2013. The applications are incorporated herein by reference.

TECHNICAL FIELD

The present invention relates to a motion simulator, and more particularly, to a motion simulator which allows various simulation operations to be more stably performed using a simple structure.

BACKGROUND ART

Generally, motion simulators provide dynamic changes to fit in a virtual environment controlled by a computer, thereby allowing a user to feel movement in virtual reality as if it were real movement, and may not only be used for flight simulation or driving simulation but have also recently been used as simulators for a three-dimensional experience in games or movie theaters.

Motion simulators perform a three-dimensional motion through a combination of a rectilinear motion and a rotary motion. A motion of an object is formed by a combination of rectilinear motions in a forward-backward direction (on a z axis), a left-right direction (on an x axis), and an up-down direction (on a y axis) and rotary motions of rolling rotation about the z axis, pitching rotation about the x axis, and yawing rotation about the y axis.

Figure 1:
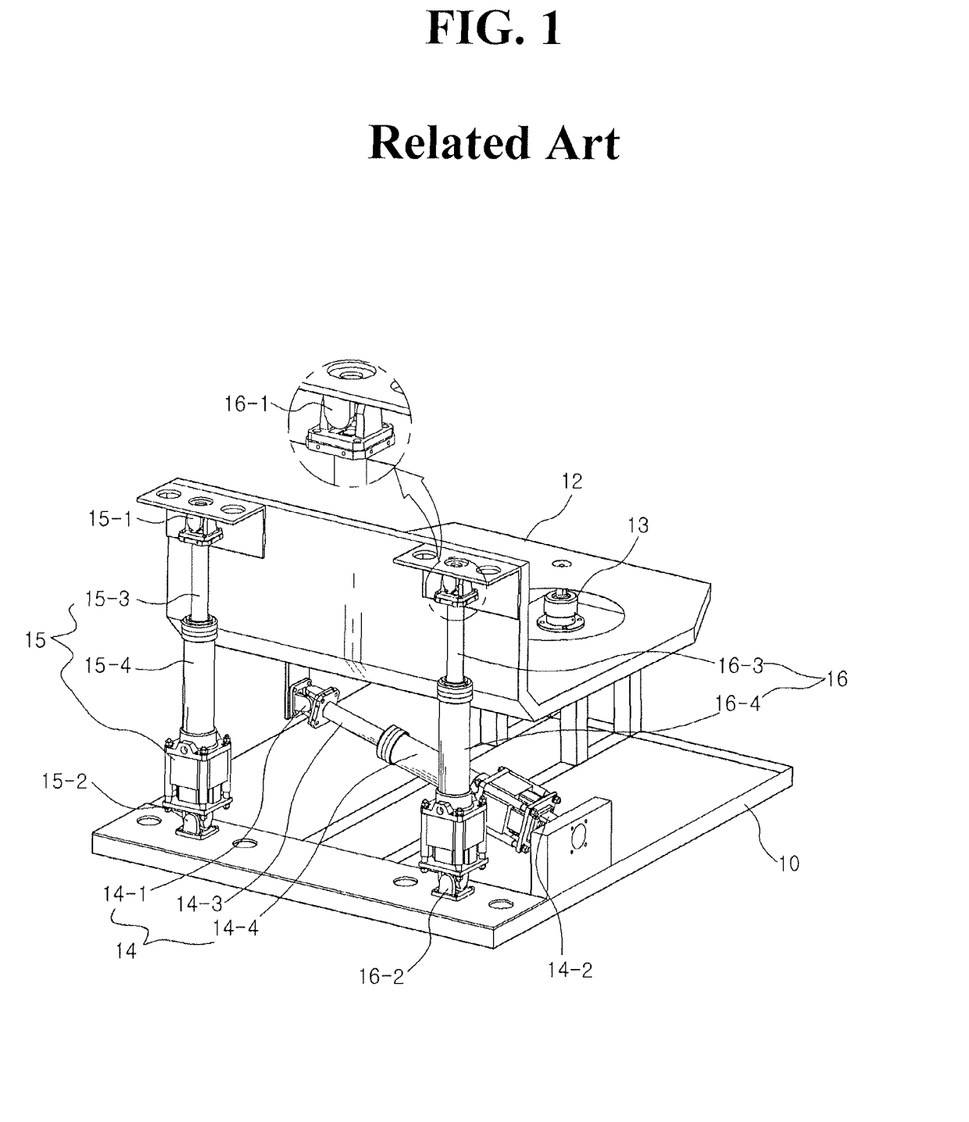
FIG. 1 is a view of a general motion simulator.

As a general simulator, Korean Patent Registration No. 10-0932231 discloses a motion base for a virtual reality motion simulator. The simulator, as shown in FIG. 1, includes a supporting frame 10, an operating frame 12, a central pivot joint 13, a horizontal actuator 14, a first vertical actuator 15, and a second vertical actuator 16 to perform a rotary motion with three degrees of freedom around the central joint 13.

In the simulator, a rotary motion is applied to the operating frame 12 due to a vertical motion of rods 15-3 and 16-3 by driving one of the first vertical actuator 15 and the second vertical actuator 16 and a rotary motion is applied to the operation frame 12 due to a horizontal motion of a rod 14-3 by driving the horizontal actuator 14, thereby providing the rotary motion with three degrees of freedom. Reference numerals 14-1, 14-2, 15-1, 15-2, 16-1, and 16-2 (not described) designate end joints, and reference numerals 14-4, 15-4, and 16-4 (not described) designate cylinders.

Due to severe oscillation which occurs during rapid movement, the general simulator decreases in stability of an apparatus and a user may feel uncomfortable, thereby undermining the reliability of a product.

SUMMARY

An aspect of the present invention is directed to provide a motion simulator in which a buffering unit for absorbing shock during an operation is provided to a link unit to prevent oscillation of the motion simulator, thereby improving stability.

One aspect of the present invention provides a motion simulator including supporting members (300, 310, 320) configured to support a chair (301) in which a user sits, a monitor (302) configured to provide images of a virtual environment according to an operation of the user, and a handle (303) operated by the user to provide the virtual environment and a plurality of link units (400, 500, 600) coupled with bottoms of the supporting members (300, 310, 320) to support and vertically move the supporting members (300, 310, 320) at the same time, in which one or more of the plurality of link units (400, 500, 600) include buffering units (710, 720) for absorbing shock.

The link units (400, 500, 600) may be formed of a first link unit (400), a top end of which is connected to a rear end of the supporting member (310) to be able to perform rolling and pitching rotations and a bottom end of which is able to perform a pitching rotation and moves the rear end of the supporting member (320) vertically with a first driver, and a second link unit (500) and a third link unit (600, top ends of which are connected to both ends of the supporting member (320) to be able to perform rolling and pitching rotation and bottom ends of which are able to perform a rolling rotation and move left and right sides of the supporting member (320) vertically with a second driver and a third driver, and the buffering units (710, 720) may be provided in the second link unit (500) and the third link unit (600), respectively.

The buffering units (710, 720) may be formed of one of gas springs, gas shock absorbers, and dampers.

The buffering units (710, 720) may be formed of a first buffering unit (710) connected to the second link unit (500) and a second buffering unit (720) connected to the third link unit (600), and when viewed from above, the first buffering unit (710), the second link unit (500), the second buffering unit (720), and the third link unit (600) may be located in a straight line.

According to a motion simulator in accordance with one embodiment of the present invention, a buffering unit such as a gas spring, a gas shock absorber, and a damper is provided in a link unit to prevent oscillation during an operation, thereby improving the reliability of a product.

|  Brief Description of Reference Numerals  | |
|---|---|
| 100: Rotary plate | 110: Motor |
| 120: Caster | 200: Fixed plate |
| 210: Second sprocket | 220: Chain |
| 230: Rotation supporting member | 231: Central axis |
| 300: Operating frame | 301: Chair |
| 302: Monitor | 303: Handle |
| 304: Pedal | 310: First supporting member |
| 320: Second supporting member | 400: First link unit |
| 410: First link member | 420: First load |

-continued

Brief Description of Reference Numerals

430: First top connection member
440: First bottom connection member
500: Second link unit510: Second link member
520: Second load530: Second top connection member
540: Second bottom connection member
600: Third link unit610: Third link member
620: Third load630: Third top connection member
640: Third bottom connection member
710: First buffering unit720: Second buffering unit

DETAILED DESCRIPTION

Hereinafter, a configuration and operation of an exemplary embodiment of the present invention will be described in detail with reference to the attached drawings.

Figure 2:
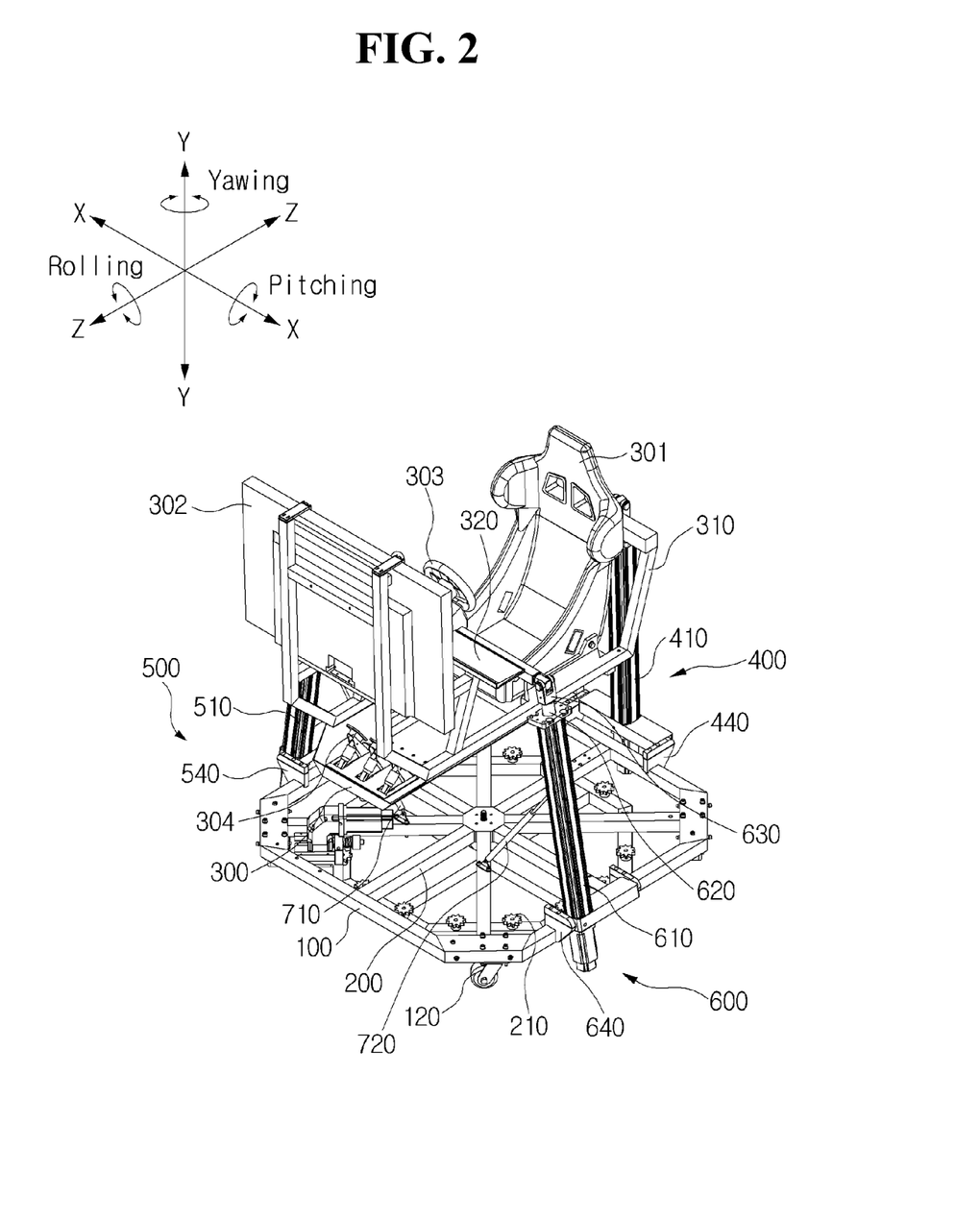
FIG. 2 is a perspective view of a motion simulator according to an embodiment of the present invention.
Figure 3:
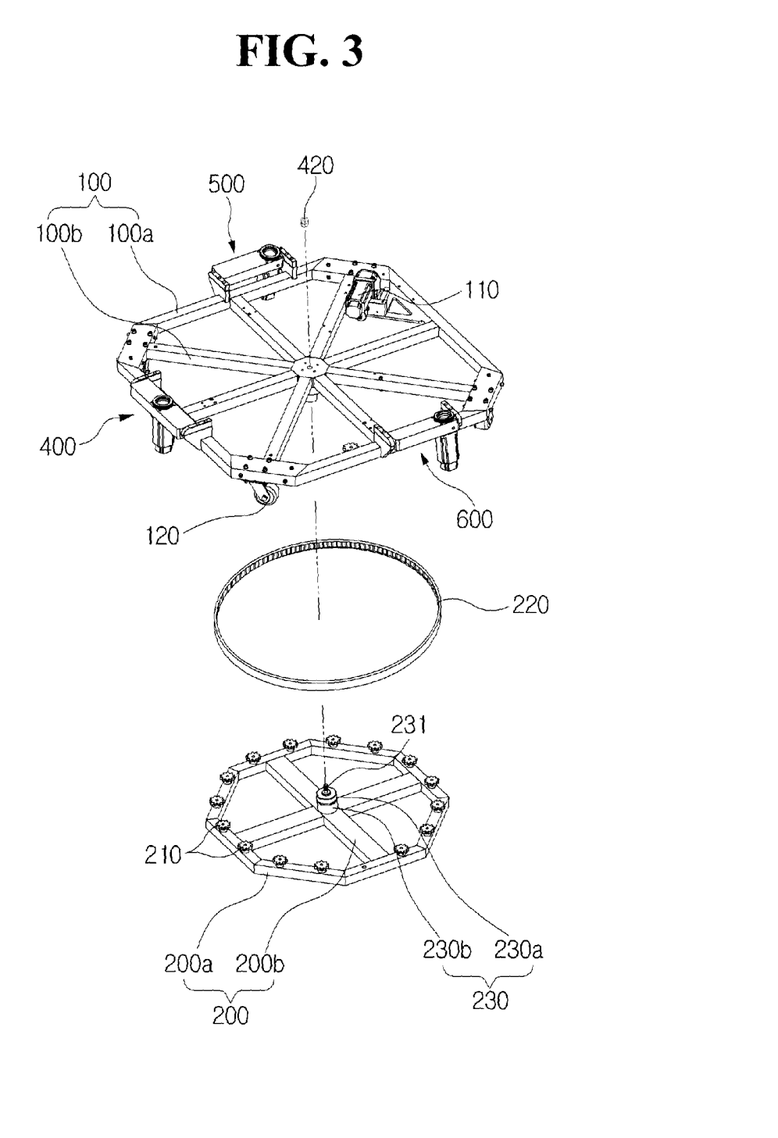
FIG. 3 is an exploded perspective view of a rotary plate and a fixed plate forming the motion simulator according to an embodiment of the present invention.

FIG. 2 is a perspective view of a motion simulator according to an embodiment of the present invention, and FIG. 3 is an exploded perspective view of a rotary plate 100 and a fixed plate 200 forming the motion simulator according to an embodiment of the present invention. Hereinafter, while describing a direction of a motion, as shown in FIG. 2, rolling is a rotary motion of rotating about a z axis which extends forward and backward, pitching is a rotary motion of rotating about an x axis which extends to the left and right, and yawing is a rotary motion of rotating about a y axis which extends up and down.

The motion simulator includes the rotary plate 100 with a motor 110 mounted on one side thereof and a plurality of casters 120 mounted on a bottom thereof, the fixed plate 200 which rotatably supports the bottom of the rotary plate 100 and includes a driven portion engaged with a shaft of the motor 110, an operating frame 300 disposed separately from a top of the rotary plate 100, and a plurality of link units 400, 500, and 600 which are coupled between the rotary plate 100 and the operating frame 300 and support and vertically move the operating frame 300 at the same time.

The operating frame 300 includes a chair 301 in which a user sits, a monitor 302 which provides a virtual environment according to an operation of the user as images, a handle 303 operated by the user to provide the virtual environment, and a pedal 304 for controlling a speed of a vehicle. Components described above are replaceable with other components depending on the use of the motion simulator. Also, the operating frame 300 is coupled with a first supporting member 310 which supports the chair 301 and the monitor 302 and a second supporting member 320 connected to the first supporting member 310 to support the handle 303, in which the operating frame 300, the first supporting member 310, and the second supporting member 320 are commonly called supporting members 300, 310, and 320.

The link units 400, 500, and 600 include a first link unit 400, a second link unit 500, and a third link unit 600 connected to a rear end, left end, and right end of the supporting members 300, 310, and 320, respectively.

The first link unit 400 includes a first link member 410 having a certain length, a first rod (not shown) which slides inside the first link member 410 due to a first driver (not shown), a first top connection member 430 connected to a top of the first rod and connected to the rear end of the first supporting member 310 to be able to roll and pitch, and a first bottom connection member 440 coupled with the top of the rotary plate 100 and connected with the first link unit 410 to be able to pitch.

Due to this configuration, when the first driver is driven, the rear end of the supporting member 310 moves vertically. The first driver may be one of a motor and a cylinder.

The second link unit 500 includes a second link member 510 having a certain length, a second rod 520 which slides inside the second link member 510 due to a second driver (not shown), a second top connection member 530 connected to a top of the second rod 520 and connected to one end of the second supporting member 320 to be able to roll and pitch, and a second bottom connection member 540 coupled with the top of the rotary plate 100 and connected with the second link unit 510 to be able to pitch.

Also, the third link unit 600 includes a third link member 610 having a certain length, a third rod 620 which slides inside the third link member 610 due to a third driver (not shown), a third top connection member 630 connected to a top of the third rod 620 and connected to the other end of the second supporting member 320 to be able to roll and pitch, and a third top connection member 640 coupled with the top of the rotary plate 100 and connected with the third link unit 610 to be able to pitch.

When the motion simulator performs a rapid operation, the user may laterally rock while seated in the chair 301, thereby decreasing stability. To prevent this, the second link unit 500 and the third link unit 600 include a first buffering unit 710 and a second buffering unit 720 for absorbing shock while the motion simulator is rapidly operating.

The first buffering unit 710 and the second buffering unit 720 may be formed of one of gas springs, gas shock absorbers, and dampers to absorb shock, thereby preventing oscillation which occurs while the motion simulator is operating.

One end of the first buffering unit 710 is connected to the second link unit 500 and the other end is connected to the rotary plate 100. One end of the second buffering unit 720 is connected to the third link unit 600 and the other end is connected to the rotary plate 100. Here, when viewed from above (that is, in a top view), the first buffering unit 710, the second link unit 500, the second buffering unit 720, and the third link unit 600 are located in a straight line.

According to the configuration described above, lateral rocking of the user is prevented while the motion simulator performs rapid operation.

It has been described above that the first buffering unit 710, the second link unit 500, the second buffering unit 720, and the third link unit 600 are located in a straight line according to an embodiment of the present invention. However, the first buffering unit 710, the second link unit 500, the second buffering unit 720, and the third link unit 600 need not be located in a straight line.

The rotary plate 100 is rotatably supported by the fixed plate 200 when the motion simulator is being used and supports the entire structure of the motion simulator when the motion simulator is moving. As shown in FIG. 3, the rotary plate 100 includes a first frame 100a which forms an edge and a plurality of second frames 100b, both ends of which are fixed to the inside of the first frame 100a at regular angular intervals.

The motor 110 which provides a driving force to allow the rotary plate 100 to rotate is mounted on the one side of the rotary plate 100. Here, the motor 110 is located to allow the shaft thereof to face downward and a first sprocket (not shown) is coupled with the shaft of the motor 110.

The plurality of casters 120 are mounted on a bottom of the first frame 100a at regular angular intervals. Bottoms of the first link unit 400, the second link unit 500, and the third link unit 600 are coupled with a top of the first frame 100a. The plurality of second frames 100b are coupled to intersect one another in a central portion of the rotary plate 100. An insertion hole (not shown) in which a central axis 231 is inserted is formed in the central portion.

The fixed plate 200 supports the entire structure of the motion simulator when the motion simulator is being used and is separated upward from a bottom surface to prevent an interference with the bottom surface when the motion simulator is moving. As shown in FIG. 3, the fixed plate 200 includes a third frame 200a forming an edge and a plurality of fourth frames 200b, both ends of which are fixed to the inside of the third frame 200a at regular angular intervals.

A rubber plate (not shown) may be disposed between a bottom end of the fixed plate 200 and the bottom surface. When the motion simulator moves, the rubber plate is removed to separate the fixed plate 200 from the bottom surface and to apply a weight of the motion simulator to the casters 120 mounted on the rotary plate 100 such that the motion simulator can move easily.

A plurality of second sprockets 210 are fixedly mounted on a top surface of the third frame 200a at equal intervals based on a central axis line. The plurality of fourth frames 200b are coupled to intersect one another in a central portion of the fixed plate 200. A rotation supporting member 230 rotatably coupled with the central axis 231 to support the rotary plate 100 is installed on a top of the central portion. The rotation supporting member 230 includes a top portion 230a and a bottom portion 230b which are connected using a bearing to be relatively rotatable in place. The rotary plate 100 and the fixed plate 200 are coupled with each other by the rotation supporting member 230 and separate from each other vertically.

The driven portion for transferring the power of the motor 110 includes the plurality of second sprockets 210 fixedly mounted on the fixed plate 200 not to rotate and a chain 220 connected to the first sprocket coupled with the shaft of the motor 110 and the plurality of second sprockets 210.

The first sprocket is flush with the second sprockets 210. The first sprocket is located eccentrically outward from a virtual connection line connecting the second sprockets 210. An inner surface of the chain 220 is connected to an outer surface of the first sprocket and outer surfaces of the plurality of second sprockets 210 to be engaged therewith.

When the motion simulator is used, the fixed plate 200 is supported by a bottom surface of a place in which the motion simulator is installed and the rotary plate 100 is separate upward from the bottom surface to allow the rotary plate 100 and the entire structure thereabove to be free to rotate. In this state, when the motor 110 operates, the first sprocket 111 coupled with the shaft of the motor 110 rotates, power is transferred to the chain 220 engaged with the first sprocket, and the plurality of second sprockets 210 are fixedly mounted on the fixed plate 200 not to rotate. Accordingly, when the power is transferred, the first sprocket 111 coupled with the shaft of the motor 110 is rotated along the inner surface of the chain 220 and the rotary plate 100 and the entire structure thereabove rotate at the same time due to repulsive force of the second sprockets 210 against the chain 220.

Figure 4:
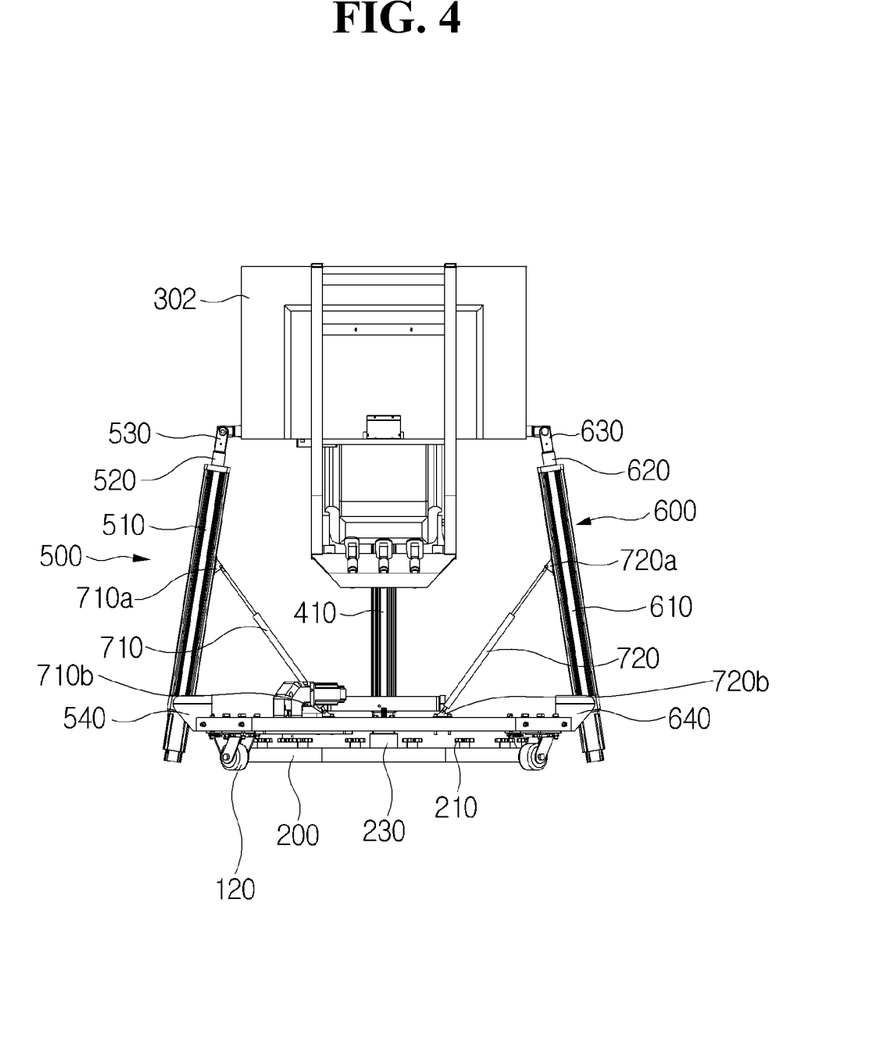
FIG. 4 is a view illustrating a state in which link units of the motion simulator are not lifted according to an embodiment of the present invention.
Figure 5:
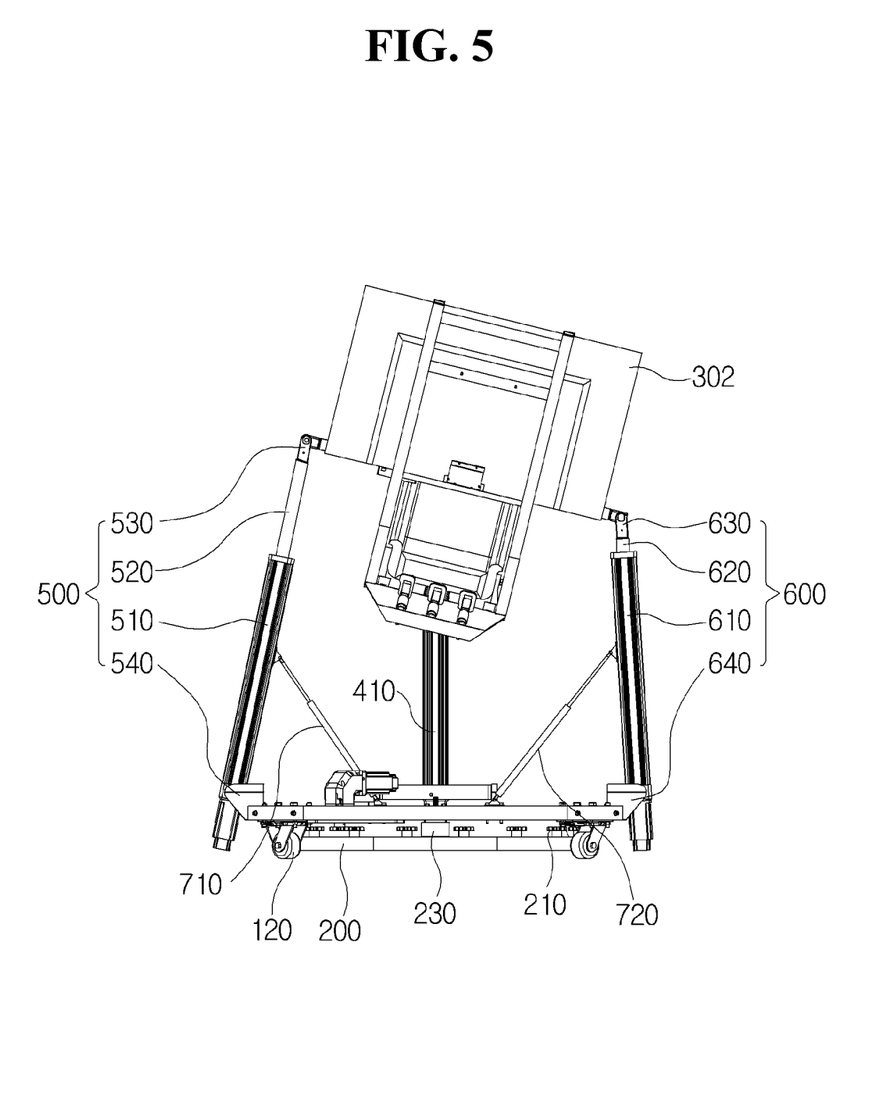
FIG. 5 is a view illustrating a state in which a second link unit of the motion simulator is lifted according to an embodiment of the present invention.
Figure 6:
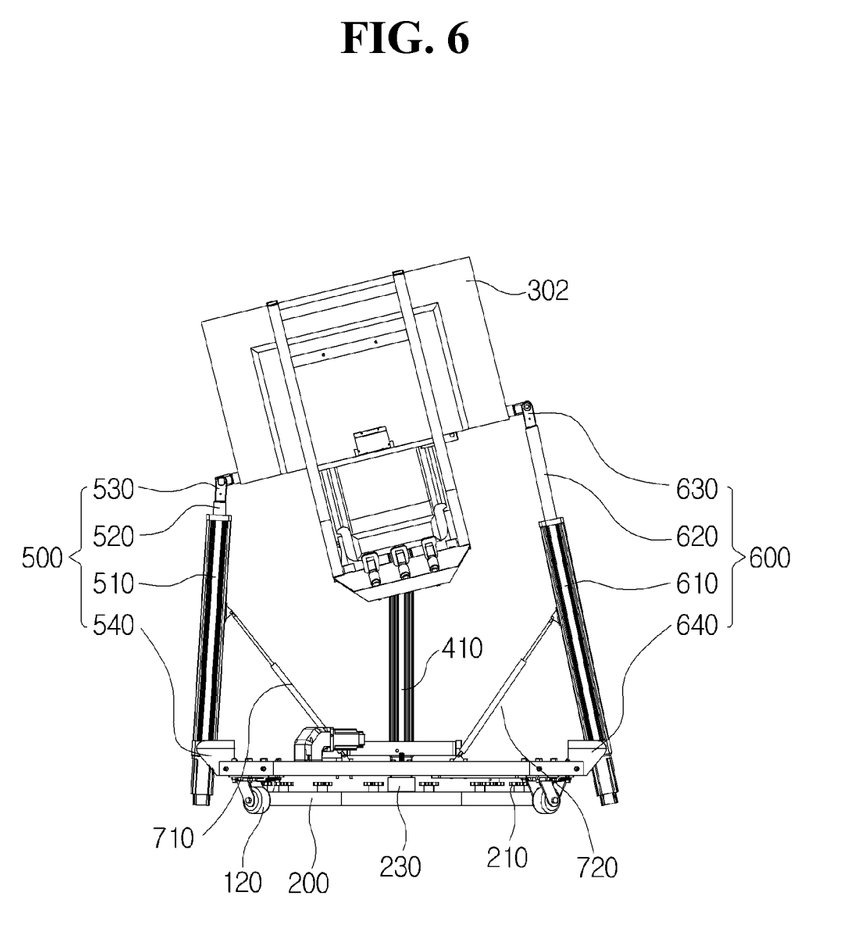
FIG. 6 is a view illustrating a state in which a third link unit of the motion simulator is lifted according to an embodiment of the present invention.

FIG. 4 is a view illustrating a state in which the link units 500 and 600 of the motion simulator are not lifted according to an embodiment of the present invention. FIG. 5 is a view illustrating a state in which the second link unit 500 of the motion simulator is lifted according to an embodiment of the present invention. FIG. 6 is a view illustrating a state in which the third link unit 600 of the motion simulator is lifted according to an embodiment of the present invention. Hereinafter, operations of the motion simulator according to an embodiment of the present invention will be described with reference to FIGS. 4 to 6. FIGS. 4 to 6 are front views.

Referring to FIG. 4, the second rod 520 and the third rod 620 are not lifted and are located on lowermost ends of the second link unit 500 and the third link unit 600.

In the state shown in FIG. 4, when the second driver operates to lift the second rod 520, the operating frame 300 and the entire structure thereabove tilt as shown in FIG. 5 and perform a rotary motion of pitching.

Also, in the state shown in FIG. 4, when the third driver operates to lift the third rod 620, the operating frame 300 and the entire structure thereabove tilt in a direction opposite to that of FIG. 5 as shown in FIG. 6 and perform a rotary motion of pitching.

During this operation process, when a rapid operation such as speeding up is performed, lateral oscillation occurs. In the present embodiment, the first buffering unit 710 and the second buffering unit 720 may prevent the lateral oscillation by absorbing shock.

It has been described above that the rotary plate 100 is provided and a yawing motion is performed according to an embodiment of the present invention. However, a buffering unit according to an embodiment of the present invention may be applied to a motion simulator which lacks the rotary plate 100 and does not perform the yawing motion.

While one or more embodiments of the present invention have been described with reference to the figures, it will be understood by those of ordinary skill in the art that various changes in form and details may be made therein without departing from the spirit and scope of the present invention as defined by the following claims.

The invention claimed is:

1. A motion simulator comprising:
   supporting members configured to support a chair in which a user sits,
   a monitor configured to provide images of a virtual environment according to an operation of the user, and
   a handle operated by the user to provide the virtual environment; and
   a plurality of link units coupled with bottoms of the supporting members to support and vertically move the supporting members at the same time,
   wherein one or more of the plurality of link units comprise buffering units for absorbing shock
   wherein the link units include a first link unit, a second link unit and a third link unit connected to a rear end, left end, and right end of the supporting members respectively,
   the first link unit includes a first link member having a bottom end which is able to perform a pitching rotation, a first rod which slides inside the first link member due to a first driver and has a top end which is connected to the rear end of the supporting members to be able to perform rolling and pitching rotations and moves the rear end of the supporting members up and down,
   the second link unit includes a second link member having a bottom end which is able to perform a rolling rotation, a second rod which slides inside the second link member due to a second driver and has a top end which is connected to the right end of the supporting members to be able to perform rolling and pitching rotations and moves the right end of the supporting members, up and down,
   the third link unit includes a third link member having a bottom end which is able to perform a rolling rotation, a third rod which slides inside the third link member due to a third driver and has a top end which is connected to the left end of the supporting members to be able to perform rolling and pitching rotations and moves the left end of the supporting members up and down, wherein the buffering units include a first buffering unit connected to the second link member and a second buffering unit connected to the third link member, and wherein, when viewed from above, the first buffering unit, the second link unit, the second buffering unit, and the third link unit are located in a straight line.

2. The motion simulator of claim 1, wherein the buffering units are formed of one of gas springs, gas shock absorbers, and dampers.

* * * * *